(12) United States Patent
Keller et al.

(10) Patent No.: US 9,669,881 B2
(45) Date of Patent: Jun. 6, 2017

(54) AXLE SUPPORT FOR A MOTOR VEHICLE HAVING A REINFORCING ELEMENT MADE OF FIBROUS COMPOSITE MATERIAL

(71) Applicant: Bayerische Motoren Werke Aktiengesellschaft, Munich (DE)

(72) Inventors: David Keller, Munich (DE); Ulrich Hammer, Munich (DE); Alfred Stenzenberger, Fuenfstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/963,396

(22) Filed: Dec. 9, 2015

(65) Prior Publication Data

US 2016/0090129 A1     Mar. 31, 2016

Related U.S. Application Data

(63) Continuation of application No. PCT/EP2014/060409, filed on May 21, 2014.

(30) Foreign Application Priority Data

Jun. 13, 2013   (DE) .......................... 10 2013 211 069

(51) Int. Cl.
*B62D 21/11*       (2006.01)
*B62D 29/04*       (2006.01)
(Continued)

(52) U.S. Cl.
CPC .......... *B62D 29/041* (2013.01); *B29C 70/202* (2013.01); *B32B 3/08* (2013.01);
(Continued)

(58) Field of Classification Search
CPC ...................................................... B62D 21/11
See application file for complete search history.

(56) References Cited

U.S. PATENT DOCUMENTS

| 2002/0050413 A1* | 5/2002 | Renault | B62D 21/11 |
| | | | 180/69.1 |
| 2012/0235397 A1* | 9/2012 | Kroger | B62D 21/11 |
| | | | 280/785 |
| 2016/0052564 A1* | 2/2016 | Graefe | B29C 43/16 |
| | | | 296/204 |

FOREIGN PATENT DOCUMENTS

| DE | 199 39 978 A1 | 3/2001 |
| DE | 103 32 969 A1 | 2/2005 |

(Continued)

OTHER PUBLICATIONS

International Search Report (PCT/ISA/210) issued in PCT Application No. PCT/EP2014/060409 dated Aug. 7, 2014 with English-language translation (six (6) pages).
German Search Report issued in counterpart German Application No. DE 10 2013 211 069.3 dated Jan. 16, 2014 with partial English-language translation (ten (10) pages).

*Primary Examiner* — Ruth Ilan
(74) *Attorney, Agent, or Firm* — Crowell & Moring LLP

(57) ABSTRACT

An axle support for a motor vehicle is provided. The axle support includes an at least approximately planar fiber composite reinforcing element which is secured to individual supports of the axle support. The reinforcing element is multi-layered, with a lower and an upper cover layer and at least one intermediate layer extending analogously to the cover layers over the entire surface. Continuous fiber strips having directionally oriented fibers which are narrow relative to the cover layers are introduced above and below the intermediate layer.

9 Claims, 2 Drawing Sheets

(51) Int. Cl.
*B32B 5/26* (2006.01)
*B29C 70/20* (2006.01)
*B32B 3/08* (2006.01)
*B32B 3/28* (2006.01)
*B29L 31/30* (2006.01)

(52) U.S. Cl.
CPC ............ *B32B 3/28* (2013.01); *B32B 5/26* (2013.01); *B62D 21/11* (2013.01); *B29L 2031/30* (2013.01); *B32B 2250/40* (2013.01); *B32B 2260/023* (2013.01); *B32B 2260/04* (2013.01); *B32B 2262/0269* (2013.01); *B32B 2262/101* (2013.01); *B32B 2262/106* (2013.01); *B32B 2605/00* (2013.01)

(56) References Cited

FOREIGN PATENT DOCUMENTS

| | | |
|---|---|---|
| DE | 10 2008 006 006 A1 | 7/2009 |
| DE | 10 2011 054 351 A1 | 4/2013 |
| DE | WO 2014187614 A1 * | 11/2014 ............. B62D 21/11 |
| DE | WO 2016003909 A1 * | 1/2016 ............. B60B 3/10 |
| EP | 0 594 131 A1 | 4/1994 |
| EP | 0 941 912 B1 | 5/2002 |
| EP | 1 712 451 A2 | 10/2006 |
| EP | 2 246 180 A2 | 11/2010 |
| EP | 2 360 082 A1 | 8/2011 |
| EP | 2 527 231 A2 | 11/2012 |

\* cited by examiner

AXLE SUPPORT FOR A MOTOR VEHICLE HAVING A REINFORCING ELEMENT MADE OF FIBROUS COMPOSITE MATERIAL

CROSS REFERENCE TO RELATED APPLICATIONS

This application is a continuation of PCT International Application No. PCT/EP2014/060409, filed May 21, 2014, which claims priority under 35 U.S.C. §119 from German Patent Application No. 10 2013 211 069.3, filed Jun. 13, 2013, the entire disclosures of which are herein expressly incorporated by reference.

BACKGROUND AND SUMMARY OF THE INVENTION

The present invention relates to an axle support of a motor vehicle, having an at least approximately planar reinforcement element which is configured as a fiber-composite component and is fastened to individual supports of the axle support. With respect to the prior art, reference is made in particular to German patent publication no. DE 10 2008 006 006 A1; moreover, European patent no. EP 0 941 912 B1 should also be stated as a further example of a motor vehicle axle support (therein also referred to as "sub frame") having a planer reinforcement element (therein also referred to as "shear area").

In the event of a crash (accident, impact on or collision with an obstacle) high forces act on the axle supports in a motor vehicle, that is to say on the front-axle support and on the rear-axle support, said high forces being capable of leading to deformation and partial destruction of the respective axle support and thus also in places of the body connected thereto. In order for the crash safety of a motor vehicle to be improved, reinforcement elements, so-called shear areas, are thus connected, preferably (releasably) screwed to the axle supports, which have comparatively high rigidity and torsional rigidity and are capable of suitably distributing the impulse of an impact across the axle support and/or to thus dissipate the same in structures of the motor vehicle. Such conventional reinforcement elements are made from metallic materials, in particular from steel or aluminum. On account thereof, a high weight is added to the motor vehicle. In order for this to be avoided, a planar axle-support reinforcement element composed of or manufactured from a fiber-composite material, respectively, (or from a fiber-reinforced plastic, respectively) has already been proposed.

The intention is to propose herein how such a fiber-composite reinforcement element of a vehicle axle support may be further improved in terms of its mechanical properties, in particular for the event of a vehicle crash, this being the object of the present invention.

The achievement of this object is characterized in that the reinforcement element is constructed from multiple layers and apart from a lower and an upper cover layer has at least one intermediate layer which in an analogous manner to the cover layers extends at least approximately across the entire area, endless-fiber tapes having aligned and oriented fibers being incorporated thereabove and therebelow.

A reinforcement element according to the invention is designed in the form of an at least approximately planar fiber-composite component, and in the installed state of said reinforcement element on the vehicle axle support, between the upper side thereof (i.e. upper cover layer) facing the vehicle bodywork and the lower side thereof (i.e. lower cover layer) facing the roadway, oriented endless-fiber tapes are integrated in the fiber-composite material. It is provided here that a lower layer of fiber tapes, which is thus adjacent to the mentioned lower cover layer and is formed from a plurality of individual fiber tapes, and an upper layer of fiber tapes, which is thus adjacent to the mentioned upper cover layer and is formed from a plurality of individual fiber tapes, are mutually separated by a so-called intermediate layer which is practically congruent with the cover layers. While thus the two cover layers and the mentioned intermediate layer extend across a substantial region, or across a notably big area (parallel with the roadway) of the axle support, the interdisposed fiber tapes according to the invention are significantly narrower than the width measurement of the cover layer(s), measured in the transverse direction of the vehicle, or the length measurement of the cover layer(s), measured in the longitudinal direction of the vehicle. When likewise viewed in the transverse direction of the vehicle, the interdisposed fiber tapes extend at least from one of the main longitudinal chassis beams of the axle support to the other main longitudinal chassis beam of the axle support, the reinforcement element usually being fastened to those main longitudinal chassis beams.

As is known, a vehicle axle support is put together from a left-side and a right-side main longitudinal chassis beam which in each case extends at least approximately in the longitudinal direction of the vehicle, said main longitudinal chassis beams being interconnected by at least one, preferably a plurality of main transverse chassis beams which extend at least approximately in the transverse direction of the vehicle, said beams being also referred to here as individual supports of the axle support.

The aligned endless-fiber tape used above will now be explained. This is to be understood as a tape which is formed from said fibers, ultimately together with a plastic material, the fibers of said tape being aligned in a targeted manner, namely in the longitudinal direction of the tape. Fibers employed here include the generally so-called endless fibers. It has already been stated in the preceding paragraph that such a tape or endless-fiber tape, respectively, when viewed in its transverse direction, is notably narrower than the width measurement or length measurement of the reinforcement element. In an axle-support reinforcement element according to the invention, at least two such endless-fiber tapes are now provided between one of the cover layers which extends across the entire area over the reinforcement element and an intermediate layer which extends at least approximately in an analogous manner to said cover layers at least approximately across the entire area over the planar reinforcement element, said endless-fiber tapes being disposed such that when collectively viewed, they do not form a structure that extends across the entire area over the reinforcement element. Thus, for example, it is not a plurality of endless-fiber tapes that are disposed so as to be mutually parallel and directly adjacent to one another. Rather, these endless-fiber tapes are disposed such that they strengthen the reinforcement element in a targeted manner.

In terms of the arrangement and/or alignment of the endless-fiber tapes, the latter in an at least approximately rectangular reinforcement element (as is usual) may at least approximately extend along the two diagonals thereof and consequently intersect one another. Forces which are not introduced into the axle support in the longitudinal direction of the vehicle (for example due to a crash taking place in an oblique manner to the vehicle axis) are thus in particular absorbed in the best manner possible and dissipated. It is furthermore proposed that the endless-fiber tapes, when viewed in a vertical projection onto the reinforcement element which is fitted to the vehicle, is at least approximately congruent with at least one individual support of the axle support, or with the main longitudinal chassis beams thereof and/or one main transverse chassis beam. Particularly intensive reinforcement or force transmission, respectively, between the individual supports of the axle support and the planar fiber-composite material reinforcement element fastened thereto thus results.

Moreover, in one advantageous embodiment of the present invention the mentioned cover layers and/or the mentioned intermediate layer may also be designed with aligned fibers, that is to say fibers which are aligned or oriented in a targeted manner, respectively. With a view to favorable force transmission, both the lower as well as the upper cover layer may be formed on their part in each case from two layers of aligned fibers which in each case run in a mutually intersecting manner at an angle of approx. 45° in relation to the longitudinal axis of the vehicle, while the likewise preferably endless fibers of the intermediate layer run substantially in the transverse direction of the vehicle. Alternatively to the fiber orientation described this far in the cover layers and in the intermediate layer, random-laid mats having long fibers or short fibers which are not aligned in a targeted manner and which are preferably from recycled material may be employed for these layers.

As is generally the case in fiber-composite components, a fiber-composite reinforcement element according to the invention has a significantly reduced dead weight as compared to conventional metallic components. In order for good rigidity, strength and high torsional rigidity to be introduced into the component, according to the invention a plurality of endless-fiber tapes are integrated in the reinforcement element, each on its part being narrow in relation to the cover layers. On account of the use of aligned endless-fiber tapes according to the invention, stress paths which dissipate deformation forces or impact impulses acting thereon along the alignment of the endless-fiber tapes and thus are ultimately capable of distributing them in a targeted manner across the vehicle body are configured to be stable in a targeted manner in the reinforcement element, on account of which localized deformation and in particular destruction of vehicle structures can be effectively counteracted. The use of endless-fiber tapes furthermore has the advantage that the amount of material cutoffs during manufacturing of the fiber-composite shear area is reduced, since the endless-fiber tapes may be readily manufactured in the desired width and cut to length according to requirements. Tailored cutting of the contours of the tapes is not required. Cutting to length of the tapes may be readily and cost-effectively carried out by way of example by means of a guillotine blade or a punching operation, on account of which the manufacturing costs may be further reduced. Particularly preferably, the reinforcement element is designed as an SMC (sheet molding compound) or manufactured by plastic injection molding, as final machining of the fiber-composite component is also thereby dispensed with. The component having the desired geometry here is preferably configured in an off-tool manner, wherein the endless fibers terminate within the component and no tool run-out is required.

The fibers of the fiber-composite material may be carbon fibers and/or glass fibers and/or aramid fibers and/or basalt fibers, since these fiber materials are distinguished by ready availability and processability with very good stability and low dead weight. With a view to potential corrosion during interaction with surrounding metallic components, glass fibers are particularly advantageous.

In order for rigidity to be further increased, the at least approximately planar fiber-composite material reinforcement element of a vehicle axle support according to the invention may have at least one reinforcement structure in the form of one or a plurality of corrugations and/or of one or a plurality of thickness grades and/or of one or a plurality of ribs, meaning that the reinforcement element is structured in such a manner. Besides a corresponding and dedicated shaping of the cover layer or of the cover layers, incorporation into the reinforcement element of dedicated constructional elements, which may be preferably likewise formed from fibrous materials and may be configured, for example, by means of back-molding by injection-molding or by pressing in the SMC construction method and be connected to the planar fiber-composite reinforcement element, may also be considered. Adhesive connection of a dedicated strengthening element to the reinforcement element is likewise possible. In this way, best possible rigidity of the latter at the lowest possible weight is achievable. Preferably, such strengthening elements or strengthening structures which protrude from that plane of the approximately planar reinforcement element that is parallel with the roadway are provided on the upper cover layer which faces the vehicle bodywork, while the lower cover layer which faces the roadway is preferably configured so as to be smooth or planar, respectively, in order to achieve good aerodynamic properties. Damage due to stone chipping or similar may be prevented by providing a cover layer having glass fibers as fiber material.

Furthermore advantageously, corrosive stability of the reinforcement element and of the components which are adjacent thereto, such as in particular the individual supports of the axle support, but also wheel control arms or other components, is further increased in that a constructive air gap and/or a corrosion-inhibiting coating are/is provided at any connection points for attachment and fastening, that is to say at contact points between these components and the fiber-composite reinforcement element.

According to one advantageous refinement, a connection element and/or a receptacle provision or a connector device, respectively, for at least a further component may be integrated in the fiber-composite reinforcement element. Such a connection element or such a receptacle provision may be permitted to enable attachment or fastening of further components and/or fastening of the reinforcement element on the axle support or on parts of the vehicle bodywork and formed from a ceramic or metallic material, for example, or likewise from a plastic. By embedding or integrating such components in the fiber-composite component (reinforcement element), respectively, these mentioned components become a fixedly integrated component part of the fiber-composite component and enhance the functionality of the latter.

It is furthermore proposed that a visco-elastic material, preferably in the form of a tier of insulation material, which may be a rubber-elastic mat, for example, is provided in the shear area in order to achieve in particular acoustic damping properties of the shear area. This tier here may form a quasi-dedicated layer in the reinforcement element.

As a result of the design embodiments and refinements according to the invention, the following advantages result in particular: The mechanical properties of the reinforcement element, such as static and dynamic rigidity, are improved. The strength of the reinforcement element is increased. Crash behavior of the reinforcement element is improved by the fiber-composite construction technique being optimized in terms of material. Locally acting deformation energy may thus be decentralized and directed away in a targeted manner by way of the stress paths formed. Driving dynamics of the vehicle and the aerodynamic characteristics thereof and the acoustics may be improved by the reinforcement element according to the invention. The weight of the reinforcement element is lower than in conventional metal construction techniques, while offering the same or better functional properties. Integration and fastening of further components is enabled. Damage due to stone chipping may be easily prevented. The manufacturing process of the reinforcement element is simplified, as a result of which manufacturing costs may be reduced.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, only those parts and components that are of interest here are illustrated; all other elements have been omitted for the sake of clarity. This applies in particular to an axle support according to the invention per se, to which a reinforcement element designed according to the invention is fastened in a preferably releasable manner. Consequently, only the reinforcement element or component parts thereof are illustrated, while the axle support may be designed so as to be similar to or comparable to the prior art mentioned at the outset.

Figure 1:
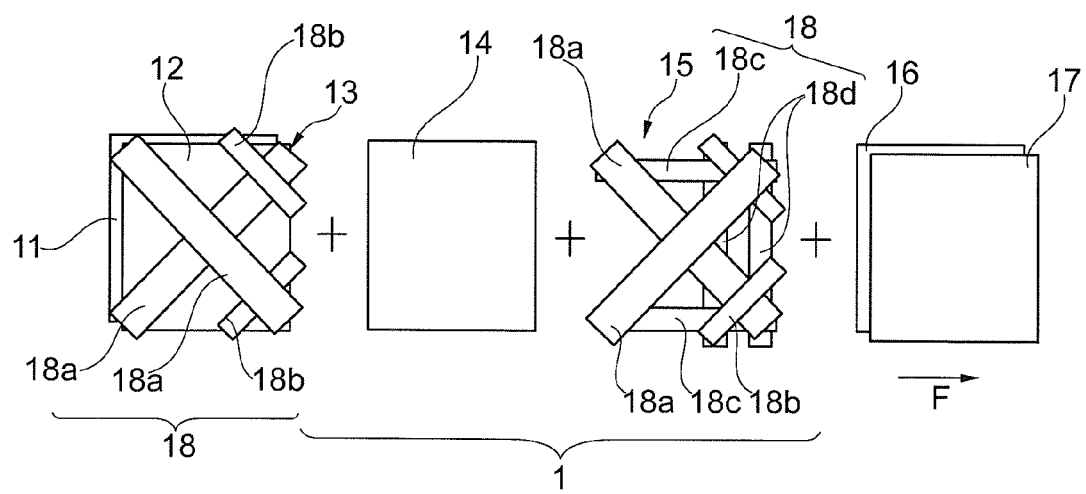
FIG. 1 shows a schematic illustration of the various layers of an axle-support reinforcement element according to an embodiment of the invention.

Individual layers 11 to 17 of an axle-support reinforcement element 1, which are formed from fiber-composite material or fiber-composite plastic, respectively, are illustrated in an extremely abstract manner and in a partially mutually superimposed and partially mutually adjacent manner in FIG. 1. Of course, the arrangement of the layers in the mutually adjacent manner illustrated in FIG. 1 is not the assembled axle support reinforcement. Rather, the lowermost layer 11 on the left in this figure, may be the lower cover layer 11 of the reinforcement element 1, facing the roadway, for example, on which the next layer 12 is laid so as to be congruent with the former, that is to say so as to have the same dimension. Thereafter (on the reinforcement element 1 installed in the vehicle), in the vertical direction and so as to be more remote from the roadway, there is a layer 13 which is formed by a plurality of endless-fiber tapes 18. Next follows a so-called intermediate layer 14 which lies on these endless tapes 18 and which extends at least approximately across the entire area over the entire face of the reinforcement element 1, and on which again closer toward the vehicle bodywork follows a layer 15 which is again formed by a plurality of endless-fiber tapes 18. In a quasi mirrored fashion in relation to intermediate layer 14, follow thereon two upper layers 16, 17, the uppermost layer 17 being the cover layer 17 which faces the vehicle bodywork. The layers 11, 12, 14, 16, and 17, when viewed in their plane, are of substantially identical dimensions, while the endless-fiber tapes 18 in relation to these mentioned layers and thus also in relation to the cover layers 11, 17, and in relation to the intermediate layer 14, are narrow.

In the finished state of the reinforcement element 1, in which the layers 11 to 17 lie on top of one another so as to be substantially congruent (with the exception of the layers 13 and 15, having the endless-fiber tapes 18), these endless-fiber tapes 18 in a targeted manner configure stress paths in the at least approximately planar reinforcement element 1, which in particular in the event of a crash decentralize the impact impulses and direct them away in a suitable manner via the structure of the axle support to which the reinforcement element 1 is fastened.

Furthermore referring to FIG. 1, two endless-fiber tapes (18), which—as has been described generally above—in the at least approximately rectangular and planar reinforcement element 1 at least approximately extend along the two diagonals thereof and consequently intersect one another, are identified by the reference signs 18a in the layer 13. In the figure the arrow F represents the driving direction of the motor vehicle. Further endless-fiber tapes 18b, which are aligned so as to be approximately parallel with these "diagonal" endless-fiber tapes 18a and are thus of course shorter and therefore even narrower, are provided in the two front (i.e., in the direction F) corner regions of the reinforcement element 1 in this layer 13.

Endless-fiber tapes 18a, 18b which are aligned as are those having the same reference sign in the layer 13 are also provided in the layer 15, between the intermediate layer 14 and the two upper layers 16 and 17. Furthermore provided in the layer 15 are endless-fiber tapes 18c which are aligned in the longitudinal direction of the vehicle (the driving direction F) and which are disposed in the lateral region of the reinforcement element 1 such that each of these endless-fiber tapes 18c in a vertical projection is brought into at least approximate congruence (superimposition) with an individual support (not illustrated in the figure) or main longitudinal chassis beam, respectively, of the axle support. Furthermore provided in the layer 15 are endless-fiber tapes 18d which are aligned in the transverse direction of the vehicle and which are disposed in the front region of the reinforcement element 1 such that each of these endless-fiber tapes 18d in a vertical projection is brought into at least approximate congruence (superimposition) with an individual support (not illustrated in the figure) or main transverse chassis beam of the axle-support.

Figure 2:
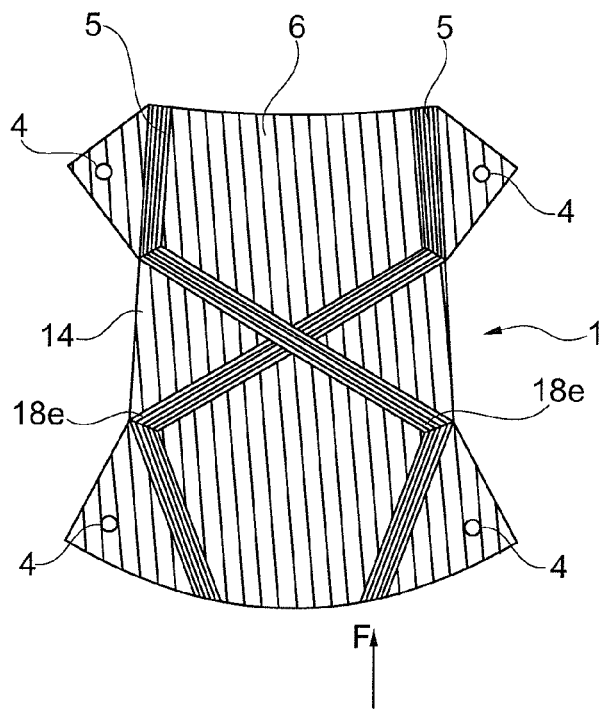
FIG. 2 shows a schematic plan view on an intermediate layer of an axle-support reinforcement element according to an embodiment of the invention, having endless-fiber tapes lying thereupon.

A planar sectional view of a further potential embodiment of a reinforcement element 1 according to the invention is shown in FIG. 2, wherein the viewing direction points toward the roadway and beside the intermediate layer 14 endless-fiber tapes 18e which are provided on said intermediate layer 14 are identifiable, said endless-fiber tapes 18e running in portions in a diagonal (and thereby mutually intersecting) manner, yet in portions also being more or less aligned in the longitudinal direction of the vehicle (cf. arrow F). The lines drawn in the endless-fiber tapes 18e and in the intermediate layer 14 are intended to represent the alignment of the endless fibers in the respective fiber-composite material, which run so as to be substantially mutually parallel. As opposed to what has been mentioned above in an exemplary manner, the endless fibers in the intermediate layer 14 thus run in the longitudinal direction of the vehicle. In this figure, holes in the peripheral region of the reinforcement element 1, by way of which the reinforcement element 1 may be fastened to the vehicle bodywork, here are identified by the reference sign 4.

Figure 3:
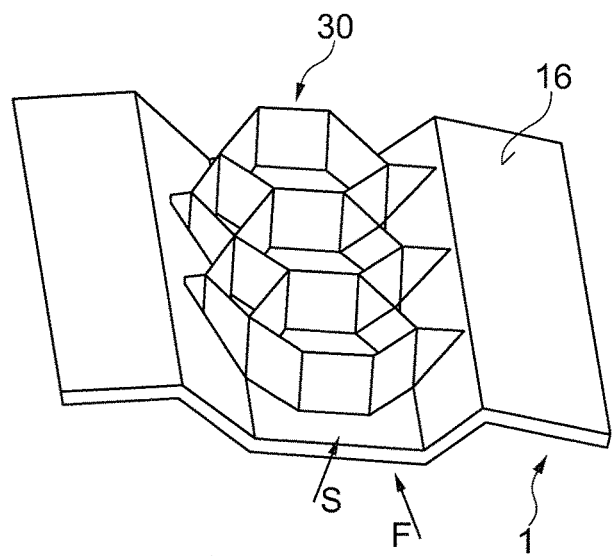
FIG. 3 shows a schematic spatial illustration of one further potential embodiment of a particularly designed layer of an axle-support reinforcement element according to the invention.

In a spatial illustration with a viewing direction (in the installed state of the reinforcement element 1 in the vehicle) from obliquely below, FIG. 3 shows in the background, so to speak, an upper cover layer 16 (and in particular the inner side thereof), such that the reinforcement element 1 here is illustrated in a sectional view. One can see that at least the upper cover layer 16 is not structured in a planar manner but has or forms a large-area corrugation S, that is to say in the installed state "bulges" toward the vehicle bodywork, so to speak, that is to say is molded in a three-dimensional manner. This corrugation S, or protrusion, respectively, or similar preferably runs in the driving direction F. A strengthening element 30, which is designed to be approximately honeycomb-shaped and which may be formed for example from ceramic, metal, or plastic and causes additional reinforcement of the reinforcement element 1 is provided in the form of an insert within this corrugation S (or protrusion or bulge S). For improved anchoring in the reinforcement element 1, the strengthening element 30 is connected in a preferably form-fitting and materially integral manner to the cover layer 16 and to a further layer which adjoins hereto toward the bottom; alternatively, such a strengthening element (30) may also be formed in a functional manner by a suitably shaped layer of fiber-composite material, for example in the form of a ribbed feature. All this substantially adds to strengthening the axle-support reinforcement element 1.

Figure 4A:
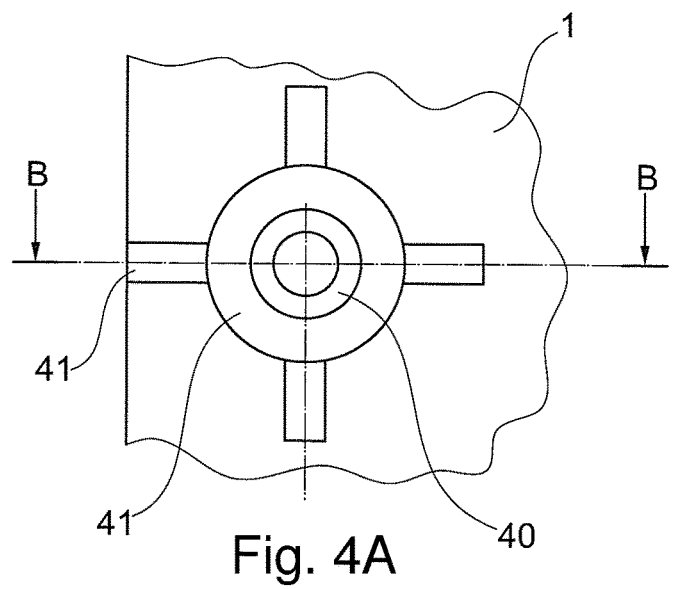
FIG. 4A shows a plan view on part of the cover layer of one further potential embodiment of an axle-support reinforcement element according to the invention, of which part-portion B-B is identified.
Figure 4B:
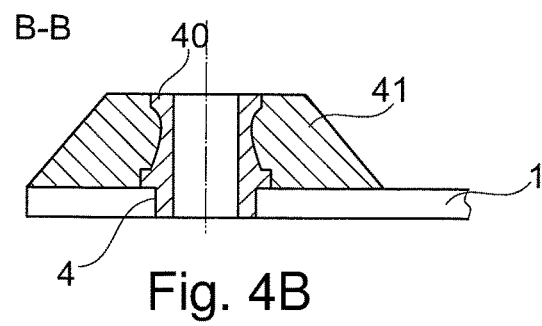
FIG. 4B illustrates the section B-B from FIG. 4A.

FIGS. 4a, 4b show only a small portion of a potential reinforcement element 1 according to the invention, specifically a connection element 40 which is provided or constructively integrated in said reinforcement element 1, respectively. By way of such a connection element 40 the reinforcement element 1 may be fastened to the vehicle body, for example, or further components may be fastened to the reinforcement element 1 by way of this connection element 40. This connection element 40, or a plurality of such or functionally comparable connection elements 40 are integrated in the fiber-composite plastic of the reinforcement element 1, wherein the connection element 40 is an element which is inserted into a breakthrough 4 or into a hole 4 in the planar reinforcement element 1 and extends in a substantially perpendicular manner to this surface, and which is retained by additionally applied plastic material 41 of the reinforcement element 1, which here partially surrounds or encases the connection element 40 in a cone-shaped manner, respectively, or is anchored on/in the reinforcement element 1, respectively. In relation to the approximately circular-cylindrical connection element 40 arms which are referred to by the reference sign 41' also protrude further outward in the radial direction from the purely conical design embodiment of the plastic material 14.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An axle support of a motor vehicle, comprising:
a plurality of axle supports; and
a reinforcement element connected to the plurality of axle supports,
wherein
the reinforcement element is formed as an at least approximately planar fiber-composite component,
the reinforcement element has a multi-layer construction including
a lower cover layer,
an upper cover layer,
at least one intermediate layer, and
endless-fiber tapes having aligned and oriented fibers arranged between the lower cover layer and the at least one intermediate layer and between the at least one intermediate layer and the upper cover layer, and
wherein the reinforcement element is rectangular, and at least two of the endless-fiber tapes extend at least approximately along two diagonals of the reinforcement element and intersect one another.

2. The axle support as claimed in claim 1, wherein at least one of the endless-fiber tapes is arranged at least approximately congruent with one of the plurality of axle supports.

3. The axle support as claimed in claim 2, wherein at least one of the lower and upper cover layers is formed from a plurality of individual fiber-composite layers.

4. The axle support as claimed in claim 2, wherein the reinforcement element includes a reinforcement structure in the form of at least one of a plurality of corrugations, at least one fiber-composite element having a different thickness than one of the cover layers, and at least one rib.

5. The axle support as claimed in claim 1, wherein at least one of an air gap and a corrosion-inhibiting coating is provided at a connection point at which the reinforcement element is configured to be connected to a further component.

6. The axle support as claimed in claim 1, wherein a lower side of the lower cover layer that faces a roadway when the axle support is in an installed position on the vehicle is a glass-fiber cover layer.

7. The axle support as claimed in claim 1, wherein the at least one intermediate layer includes at least one visco-elastic material layer.

8. The axle support as claimed in claim 1, wherein the reinforcement element includes at least one of a connection element and a receptacle configured to be connected to a further component.

9. The axle support as claimed in claim 1, wherein the fiber-composite of the reinforcement element includes at least one of carbon fibers, glass fibers, aramid fibers and basalt fibers.

* * * * *